United States Patent
Cho et al.

(10) Patent No.: US 9,325,507 B2
(45) Date of Patent: Apr. 26, 2016

(54) SYSTEM AND METHOD FOR MANAGING MOBILE DEVICE USING DEVICE-TO-DEVICE COMMUNICATION

(71) Applicant: Daegu Gyeongbuk Institute of Science and Technology, Daegu (KR)

(72) Inventors: Kookrae Cho, Daegu (KR); Jong Wuk Son, Daegu (KR); Shi Quan Piao, Daegu (KR); Hye Min Seong, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 22 days.

(21) Appl. No.: 14/536,812

(22) Filed: Nov. 10, 2014

(65) Prior Publication Data
US 2015/0264052 A1    Sep. 17, 2015

(30) Foreign Application Priority Data

Mar. 11, 2014  (KR) .......................... 10-2014-0028414

(51) Int. Cl.
| | |
|---|---|
| *H04L 9/32* | (2006.01) |
| *H04W 4/00* | (2009.01) |
| *H04L 29/06* | (2006.01) |
| *H04W 8/18* | (2009.01) |
| *H04L 9/08* | (2006.01) |

(52) U.S. Cl.
CPC ............ *H04L 9/3247* (2013.01); *H04L 9/0825* (2013.01); *H04L 63/0428* (2013.01); *H04W 4/008* (2013.01); *H04W 8/18* (2013.01)

(58) Field of Classification Search
CPC ... H04L 63/10; H04L 63/0428; H04L 9/3247; H04L 2209/24; H04L 2209/72; H04W 4/008; H04W 8/02; H04W 12/04
USPC ................................................ 713/176; 726/4
See application file for complete search history.

(56) References Cited

U.S. PATENT DOCUMENTS

| | | | | |
|---|---|---|---|---|
| 8,306,229 | B2* | 11/2012 | Pang ..................... | H04L 9/0891 380/278 |
| 8,353,050 | B2 | 1/2013 | Klassen et al. | |
| 8,447,979 | B2* | 5/2013 | Li ........................... | H04L 63/08 455/432.1 |
| 8,769,276 | B2* | 7/2014 | Noh ..................... | G06F 21/6245 713/168 |
| 8,898,468 | B2* | 11/2014 | Reddy ..................... | H04K 3/25 380/270 |
| 2005/0144439 | A1* | 6/2005 | Park ........................ | H04L 63/06 713/155 |
| 2010/0037053 | A1* | 2/2010 | Stenberg ............. | H04L 63/0853 713/169 |
| 2015/0304484 | A1* | 10/2015 | Halmstad .......... | H04M 1/72577 455/419 |

* cited by examiner

*Primary Examiner* — Amare F Tabor
(74) *Attorney, Agent, or Firm* — Sughrue Mion, PLLC

(57) ABSTRACT

Provided are a system and method for managing a mobile device using device-to-device (D2D) communication in which a D2D communication-based mobile device management (MDM) manager is given authority to manage a D2D communication-based MDM client by an MDM server and can directly manage a user mobile device at a short distance based on D2D communication.

19 Claims, 10 Drawing Sheets

FIG. 4

| MID | CID | VALIDITY PERIOD | ADDITIONAL INFORMATION |
|-----|-----|-----------------|------------------------|

FIG. 6

| MID | CID | SITE BLOCKING | | CAMERA | |
|-----|-----|-----|-----|-----|-----|
| # | # | ON | OFF | ON | OFF |

| GPS | | 3G | | ... | ... |
|-----|-----|-----|-----|-----|-----|
| ON | OFF | ON | OFF | ... | ... |

| LOCKING DEVICE | |
|-----|-----|
| ON | OFF |

FIG. 8

| MID | CID | VALIDITY PERIOD | MC | (CIPHER) | ADDITIONAL INFORMATION |

FIG. 10

| MID | CID | Wi-Fi | ON | ADDITIONAL INFORMATION |
|---|---|---|---|---|

MANAGEMENT CONTENT (spanning Wi-Fi and ON)

SYSTEM AND METHOD FOR MANAGING MOBILE DEVICE USING DEVICE-TO-DEVICE COMMUNICATION

CROSS-REFERENCE TO RELATED APPLICATION

This application claims priority to and the benefit of Korean Patent Application No. 10-2014-0028414, filed on Mar. 11, 2014, the disclosure of which is incorporated herein by reference in its entirety.

BACKGROUND

1. Field of the Invention

The present invention relates to a system and method for managing a mobile device using device-to-device (D2D) communication, and more particularly, to a system and method for managing a mobile device using D2D communication in which a mobile device management (MDM) manager is given authority to manage a D2D communication-based MDM client by an MDM server and can directly manage a user mobile device at a short distance based on D2D communication.

2. Discussion of Related Art

To ensure portability and mobility, older portable terminals had only a phone call function, but, to meet various demands of users, recently released portable terminals have a short-range communication module, a universal serial bus (USB) port, a large-capacity memory, a high-performance camera module, etc. and are changing into total multimedia devices capable of performing various functions, such as Internet-related functions, a data storage function, and an image capturing function.

In this way, portable terminals have been recently replacing various multimedia devices.

However, the above-described improvement in the functionality of portable terminals may cause an unwanted effect in that the portable terminals may be used as means of threatening security. For example, a portable terminal having a high-performance camera module may be used as a device for leaking a trade secret.

To solve this problem, an MDM system has been recently proposed. The MDM system denotes a system capable of managing a portable terminal using a wireless transmission technology (over the air (OTA)) anytime and anywhere as long as the power of the portable terminal is on.

Such an MDM system was originally intended to optimize functions of portable terminals, such as cellular phones, with a short service down time and the smallest cost by managing application distribution to the portable terminals, change of data and configurations, and device managers in an integrated manner at a remote site. However, due to recent measures against security threats, the MDM system is becoming the core element for the security of portable terminals.

In the existing MDM system for controlling and managing mobile devices, a mobile device manager that intends to control a user mobile device transmits control and management messages to an MDM server, and the MDM server transfers the message to the user mobile device via server push communication, thereby performing control and management functions, such as locking of the user mobile device and inquiring about global positioning system (GPS) position information.

As mentioned above, the control and the management of a user mobile device based on existing MDM is available only when the mobile device user is kept connected to the Internet via a wireless fidelity (Wi-Fi) system, a third generation (3G) system, a fourth generation (4G) system, or so on. When the Internet connection of the user mobile device is cut off, a control message is not transferred, and also it is not possible to know whether or not the user mobile device is continuously under control.

In addition, a user mobile device is configured to respond to an MDM message at all times, and thus is exposed to an attack of a hacker posing as an MDM server at a remote site.

Further, since a personal mobile device is used for business and other purposes, much information on a user is stored in the mobile device. Users dislike the possibility that, when an MDM program is installed in their personal mobile devices, they may be surveilled at all times or their privacy may be invaded through extraction of personal information. Consequently, there is a need for a technical solution that may enable the control and the management of a user device in a company, a school, etc., but prevents the control and the management in places other than the company, the school, etc.

SUMMARY OF THE INVENTION

The present invention is directed to providing a system and method for managing a mobile device using device-to-device (D2D) communication in which a mobile device management (MDM) manager is given authority to manage a D2D communication-based MDM client by an MDM server and can directly manage a user mobile device at a short distance based on D2D communication.

According to an aspect of the present invention, there is provided a system for managing a mobile device using D2D communication, the system including: an MDM server; a user mobile device having a D2D MDM client (D2D client); and an administrator mobile device having a D2D MDM manager (D2D manager). The D2D manager acquires authority to manage the D2D client from the MDM server and manages the D2D client, and the D2D client performs an operation in the user mobile device according to management of the D2D manager and transmits a result value of the operation to the MDM server via the D2D manager.

When an authority request message for managing the D2D client is received from the D2D manager, the MDM server may transmit a management authorization message including a valid management period to the D2D manager, and the D2D manager may manage the D2D client for the valid management period.

The MDM server may receive the operation result value transmitted from the D2D client and update a state table of the user mobile device.

After acquiring the management authority from the MDM server, the D2D manager may transmit a management message including management information to the D2D client, and the D2D client may perform the operation according to the management information included in the management message.

According to another aspect of the present invention, there is provided a method of managing a mobile device using D2D communication in a mobile management system including an MDM server, the method including: transmitting, from a D2D MDM manager (D2D manager), a D2D MDM client (D2D client) management authorization request message to the MDM server to acquire management authority from the MDM server; managing, by the D2D manager having acquired the management authority, a D2D MDM client (D2D client) for a previously set validity period; and transmitting, from the D2D manager, an operation result value of a user mobile device acquired while managing the D2D client to the MDM server.

The method may further include receiving, by the MDM server, the operation result value, and updating a state table of the user mobile device.

When the management authorization request message is received from the D2D manager, the MDM server may transmit an authorization message including the validity period, and the D2D manager may manage the D2D client for the validity period.

The acquiring of the management authority may include: encrypting, by the D2D manager, the management authorization request message together with a unique number of the D2D client to be managed with a server-manager secret key and transmitting the encrypted management authorization request message and the encrypted unique number to the MDM server; encrypting, by the MDM server, a management authorization message including the validity period and a server electronic signature value for the management authorization message with the server-manager secret key, and transmitting the management authorization message and the server electronic signature value to the D2D manager; generating, by the D2D manager, a manager-client secret key, generating a message encrypted with a public key of the D2D client to be managed, and transmitting the encrypted message together with a manager electronic signature value for the encrypted message to the D2D client; and receiving, by the D2D client, the message encrypted by the D2D manager, verifying the manager electronic signature value, decrypting the encrypted message, and storing the management authorization message and the manager-client secret key when the manager electronic signature value is valid.

The message encrypted with the public key of the D2D client to be managed may include a unique number of the D2D manager, the manager-client secret key, the management authorization message, and the server electronic signature value.

The storing of the management authorization message and the manager-client secret key may include decrypting, by the D2D client, the encrypted message transmitted from the D2D manager to extract the unique number of the D2D manager, the manager-client secret key, the management authorization message, and the server electronic signature value, and verifying whether the server electronic signature value is valid.

The method may further include, after the verifying of the manager electronic signature value, transmitting, from the D2D client, a verification-success signal to the MDM server via the D2D manager.

The acquiring of the management authority may include: transmitting, from the D2D manager, the management authorization request message together with a unique number of the D2D client to be managed to the MDM server; generating, by the MDM server, a manager-client secret key to be used by the D2D manager and the D2D client, and encrypting the generated secret key with a server-client secret key to generate a cipher; generating, by the MDM server, a management authorization message, encrypting the generated management authorization message with a server-manager secret key, and transmitting the management authorization message to the D2D manager; decrypting, by the D2D manager, the management authorization message to extract the cipher, encrypting the authorization message with the manager-client secret key, and transmitting the encrypted authorization message together with cipher to the D2D client; and decrypting, by the D2D client, the cipher with the server-client secret key to extract the manager-client secret key, and decrypting the encrypted management authorization message with the manager-client secret key to acquire the management authorization message.

The management authorization message may include a unique number of the D2D manager, the unique number of the D2D client, the validity period, and the manager-client secret key.

According to another aspect of the present invention, there is provided a system for managing a mobile device using D2D communication, the system including: an MDM server; a user mobile device having a D2D MDM client (D2D client); and an administrator mobile device having a D2D MDM manager (D2D manager). The D2D manager transmits a management message including management information for the D2D client to the MDM server, receives a management response message from the MDM server, and manages the D2D client, and the D2D client implements management content in the user mobile device and transmits a management result value to the MDM server via the D2D manager.

The MDM server may determine whether the D2D manager having transmitted the management message has authority to manage the D2D client and, when it is determined that the D2D manager has the authority to manage the D2D client, encrypts ciphertext obtained by encrypting the management response message and the management response message with a server-manager secret key, and transmits the ciphertext and the management response message to the D2D manager.

The D2D manager may decrypt the ciphertext and the management response message transmitted from the MDM server to extract the management response message and the ciphertext, and transmit the ciphertext to the D2D client.

According to another aspect of the present invention, there is provided a method of managing a mobile device using D2D communication in a mobile management system including an MDM server, the method including: transmitting, from a D2D MDM manager (D2D manager), an encrypted management message to the MDM server; determining, by the MDM server, whether the D2D manager has authority to manage a D2D client, and transmitting a management response message to the management message to the D2D server; transmitting, from the D2D manager, the management response message to the D2D client; performing, by the D2D client, an operation of a user mobile device according to content of the response message and transmitting a result value of the operation to the D2D manager; and transmitting, from the D2D manager, the operation result value to the MDM server, and updating, by the MDM server, a state table of the user mobile device with the operation result value.

The transmitting of the encrypted management message may include encrypting, by the D2D manager, the management message and a unique number of the D2D client with a server-manager secret key and transmitting the management message and the unique number to the MDM server.

The transmitting of the management response message may include generating, by the MDM server, ciphertext by encrypting the management response message with a server-client secret key, encrypting again the management response message and the ciphertext with a server-manager secret key, and transmitting the management response message and the ciphertext to the D2D manager.

The transmitting of the management response message to the D2D client may include decrypting, by the D2D manager, the encrypted management response message and the encrypted ciphertext to extract the management response message and the ciphertext, and transmitting the ciphertext to the D2D client.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 4 is a diagram showing a packet structure of an authorization message according to an exemplary embodiment of the present invention;

FIG. 6 is a diagram showing a structure of a device state table according to an exemplary embodiment of the present invention;

FIG. 8 is a diagram showing another packet structure of an authorization message according to the first exemplary embodiment of the present invention;

FIG. 10 is a diagram showing a packet structure of a management message according to the second exemplary embodiment of the present invention.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
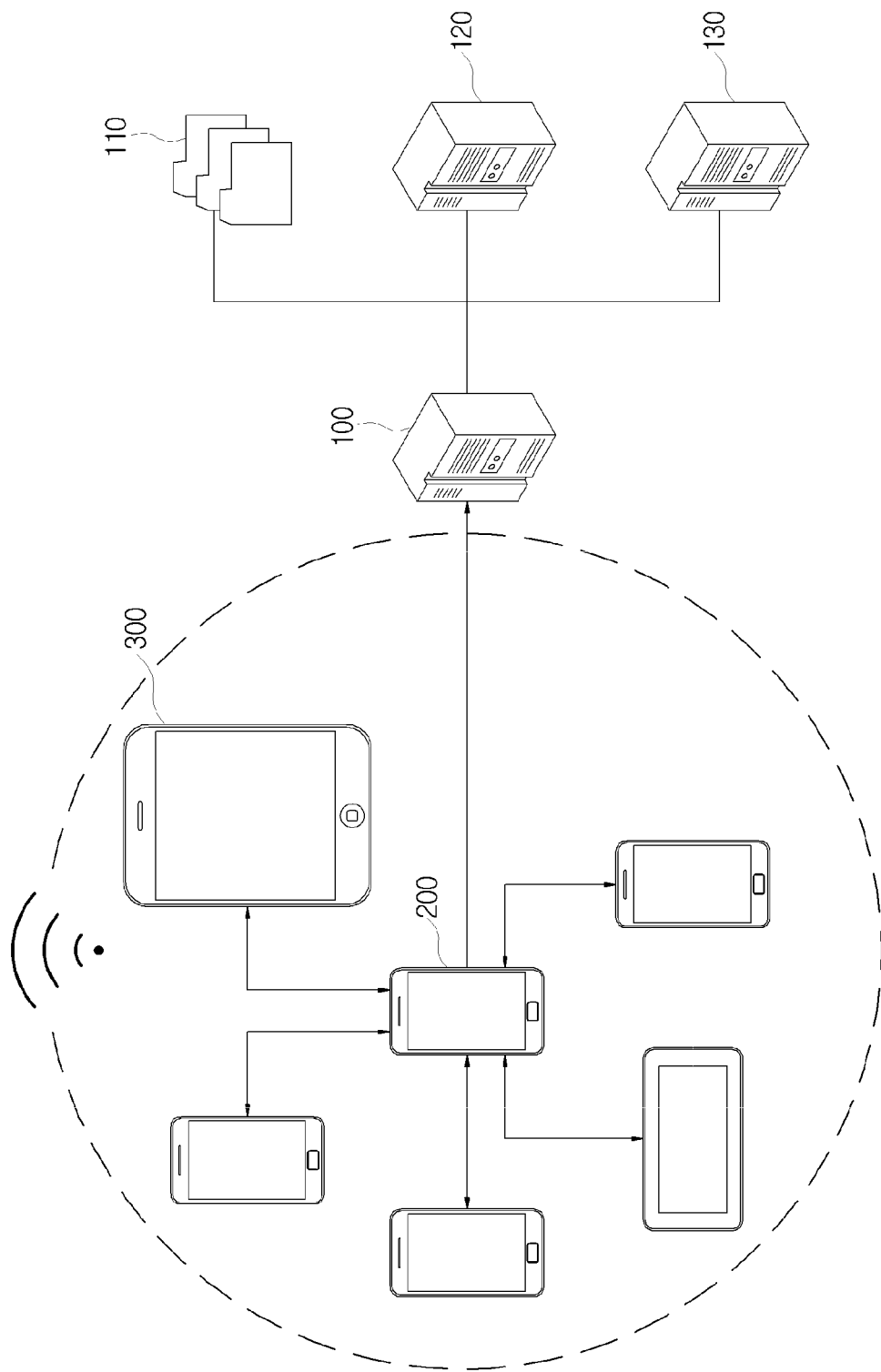
FIG. 1 is a diagram showing a constitution of a system for managing a mobile device using device-to-device (D2D) communication according to an exemplary embodiment of the present invention.

FIG. 1 is a diagram showing a constitution of a system for managing a mobile device using device-to-device (D2D) communication according to an exemplary embodiment of the present invention.

Referring to FIG. 1, a system for managing a mobile device using D2D communication (herein, referred to as "D2D mobile management system") according to an exemplary embodiment of the present invention includes a mobile device management (MDM) server 100, a D2D -based MDM manager (herein, referred to as "D2D manager") 200, and a D2D MDM client (herein, referred to as "D2D client") 300.

The MDM server 100 may include a database 110, a registration server 120, and an authentication system 130.

The D2D manager 200 is given authority to control and manage the D2D client 300 by the MDM server 100, and controls and manages the D2D client 300.

At this time, the D2D manager 200 transmits a management message for detection/blocking of harmful websites, detection/blocking of harmful applications, locking/releasing of terminals, locking/releasing of making of phone calls, wireless fidelity (Wi-Fi) control, camera control, etc. to the D2D client 300 via a D2D short-range communication network, such as a Wi-Fi Direct network or a Long Term Evolution (LTE) D2D network, and the D2D MDM client 300 executes the received management message.

Meanwhile, the D2D manager 200 receives changes in the control and management states of a user mobile device from the D2D client 300, and periodically transfers the received changes in the control and management states of the user mobile device to the MDM server 100, thereby synchronizing the control and management states of the user mobile device with the MDM server 100.

Here, the D2D manager 200 denotes a program installed on a mobile device for an administrator having a D2D communication module, such as a Wi-Fi Direct communication module or an LTE D2D communication module, a third generation (3G) communication module, a fourth generation (4G) communication module, etc., or a mobile device on which the program is installed.

Also, the D2D client 300 denotes a program installed on a mobile device for a user having a D2D communication module, such as a Wi-Fi Direct communication module or an LTE D2D communication module, a 3G communication module, a 4G communication module, etc., or a mobile device on which the program is installed.

The D2D mobile management system having the constitution shown in FIG. 1 may be configured as two types of D2D mobile management systems according to operation.

One type is a basic D2D mobile management system, in which the D2D manager 200 acquires authority to manage the D2D client 300 from the MDM server 100 and continuously manages the D2D client 300 for a predetermined period.

The other type is a security-fortified D2D mobile management system, in which the D2D manager 200 receives a management message from the MDM server 100 during each time of management of the D2D client 300 and manages the D2D client 300 according to the management message.

When the security-fortified D2D mobile management system is used, the D2D manager 200 may be prevented from carelessly controlling the D2D client 300. Also, control and management messages that are used for managing a mobile device in an existing MDM server can be used as they are, and thus compatibility may be maintained with existing technology.

Management operations of the aforementioned two types of D2D mobile management systems will be separately described below with reference to the accompanying drawings.

First Exemplary Embodiment

Figure 2:
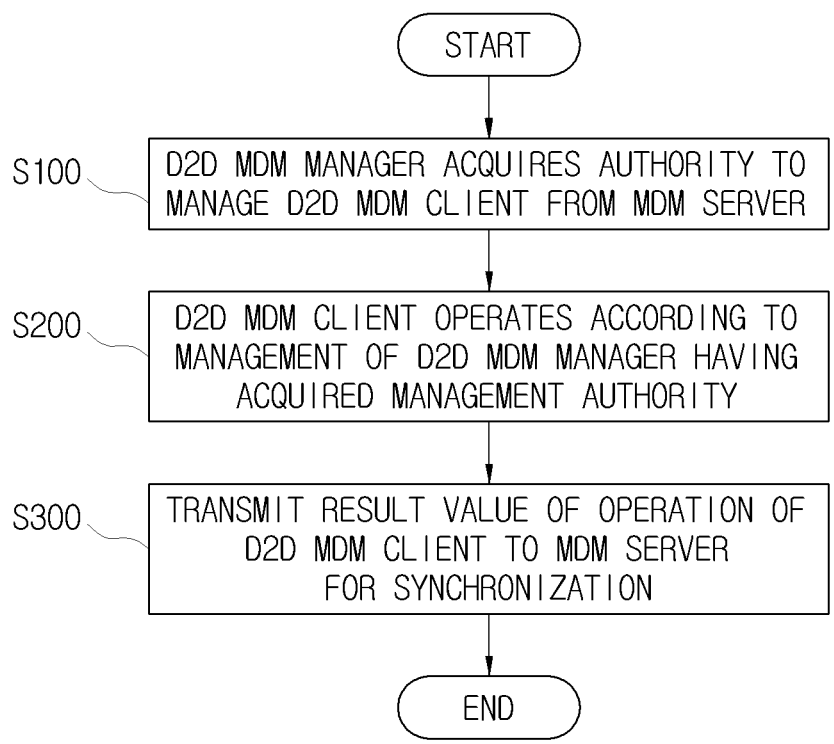
FIG. 2 is an operational flowchart illustrating a method of managing a mobile device in a D2D mobile management system according to a first exemplary embodiment of the present invention.

FIG. 2 is an operational flowchart illustrating a method of managing a mobile device using D2D communication in a D2D mobile management system according to a first exemplary embodiment of the present invention.

The first exemplary embodiment described below relates to a D2D mobile management system referred to as a basic D2D mobile management system in the present invention. A method of managing a mobile device using D2D communication according to the first exemplary embodiment will be described, focusing on the operation of each component.

The method of managing a mobile device using D2D communication according to the first exemplary embodiment includes an authority acquisition operation S100, a device management operation S200, and a server synchronization operation S300.

In the authority acquisition operation S100, the D2D manager 200 acquires authority to manage the D2D client 300 from the MDM server 100.

At this time, the D2D manager 200 makes a management authorization request to the MDM server 100. The MDM server 100 determines whether the D2D manager 200 that has made the management authorization request is a legitimate manager, and gives the D2D manager 200 the authority to manage the D2D client 300 when it is determined that the D2D manager 200 is a legitimate manager.

Also, the D2D manager 200 notifies the management-target D2D client 300 that the D2D manager 200 has been given the authority by the MDM server 100.

The operation in which the D2D manager 200 requests the authority to manage the D2D client 300 from the MDM server 100, the operation in which the MDM server 100 gives the D2D manager 200 the authority to manage the D2D client 300, and the operation in which the D2D manager 200 notifies the D2D client 300 that the D2D manager 200 has been given the authority to manage the D2D client 300 by the MDM server 100 are performed through encryption and decryption processes, which will be described later.

In the device management operation S200, the D2D manager 200 having acquired the authority to manage the D2D client 300 from the MDM server 100 manages the D2D client 300 for a previously set validity period.

At this time, the D2D manager 200 generates a management message and then transmits the generated management message together with management authority information to the D2D client 300. The D2D client 300 performs an operation according to the management message received from the D2D manager 200 in the user mobile device, and transmits a result value of the operation to the D2D manager 200.

In the server synchronization operation S300, the D2D manager 200 transfers a result value of a state change of the user mobile device, which is acquired from the D2D client 300 while the D2D manager 200 manages the D2D client 300 for the previously set validity period, to the MDM server 100.

Meanwhile, the MDM server 100, the D2D manager 200, and the D2D client 300 exchange various messages or signals using encryption and decryption processes.

Figure 3:
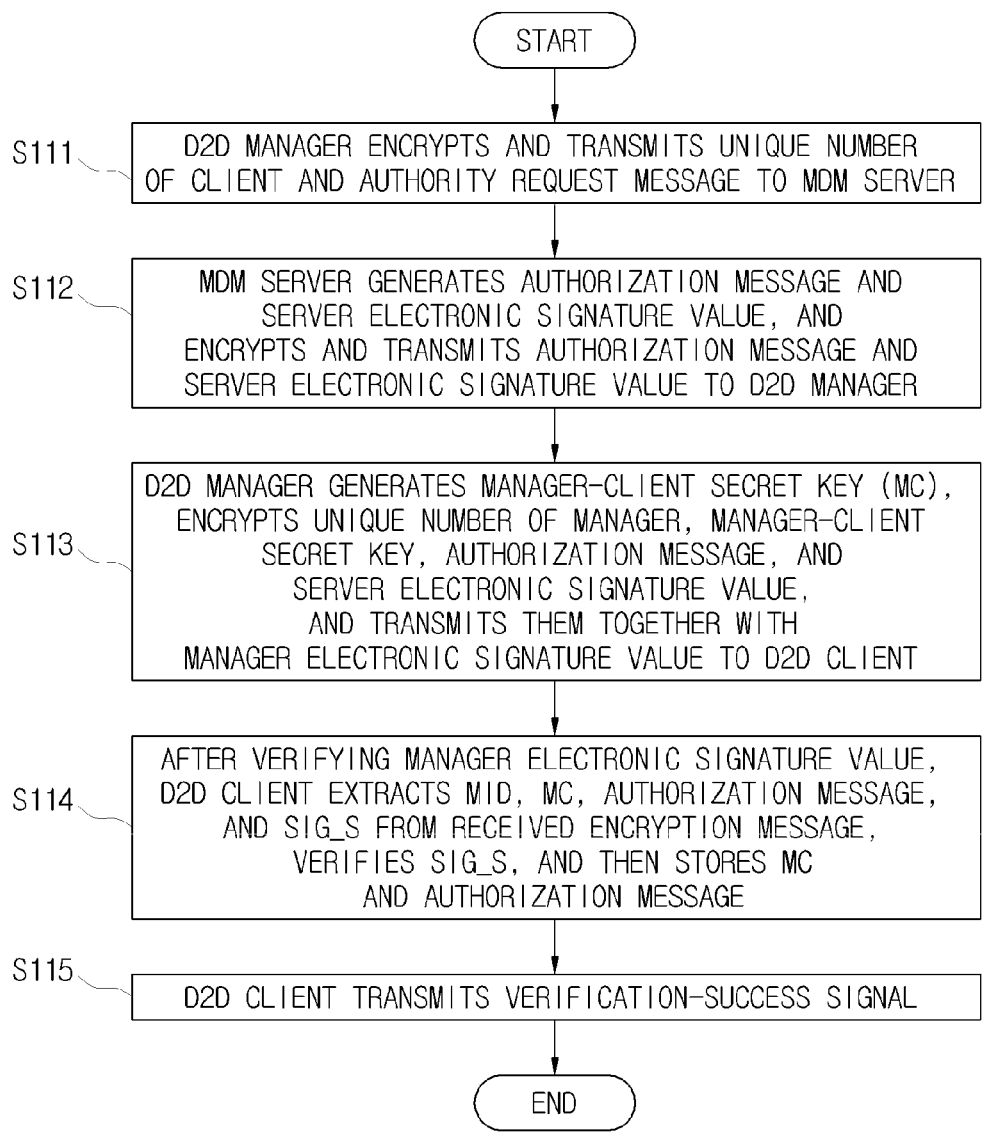
FIG. 3 is a detailed operational flowchart illustrating a method for a D2D manager to acquire authority to manage a D2D client from a mobile device management (MDM) server according to the first exemplary embodiment of the present invention.

FIG. 3 is a detailed operational flowchart illustrating a method for a D2D manager to acquire authority from an MDM server according to the first exemplary embodiment of the present invention.

The MDM server 100 has a server public key PUB_S, a server private key PRI_S, a server-manager secret key SM, and a server-client secret key SC, and the D2D manager 200 has a manager public key PUB_M, a manager private key PRI_M, and the server-manager secret key SM.

Also, the D2D client 300 has a client public key PUB_C, a client private key PRI_C, and the server-client secret key SC. These keys may be set when the D2D manager 200 and the D2D client 300 initially install a program from the MDM server 100.

First, the D2D manager 200 encrypts a unique number (client identification (CID)) of the D2D client 300 to be controlled and an authority request message with the server-manager secret key SM, and transmits a first encryption message M1 to the MDM server 100 (S111).

Subsequently, the MDM server 100 decrypts the first encryption message M1 transmitted from the D2D manager 200, generates an authorization message having a packet structure as shown in FIG. 4 and a server electronic signature value Sig_S for the authorization message, encrypts the generated authorization message and the server electronic signature value Sig_S with the server-manager secret key SM, and then transmits a second encryption message M2 to the D2D manager 200 (S112).

In FIG. 3, a management identification (MID) is the unique number of the D2D manager 200 having transmitted the authority request message, a CID is the unique number of the D2D client 300 to be managed by the D2D manager 200 having transmitted the authority request message, and a validity period is the validity period of the authorization message.

Subsequently, the D2D manager 200 decrypts the authorization message from the second encryption message M2 transmitted from the MDM server 100, stores the authorization message, generates a manager-client secret key MC to be used in communication with the D2D client 300, and generates a third encryption message M3 about the MID, the manager-client secret key MC, the authorization message, and the server electronic signature value Sig_S with the client public key PUB_C of the client 300 to be controlled.

Also, the D2D manager 200 generates an electronic signature value sig for the third encryption message M3, and transmits the electronic signature value sig together with the third encryption message M3 to the D2D client 300 (S113).

When the third encryption message M3 transmitted from the D2D manager 200 is received, the D2D client 300 verifies the electronic signature value sig of the D2D manager 200 for the third encryption message M3. When the electronic signature value sig is valid, the D2D client 300 decrypts the third encryption message M3 with the private key PRI_C to extract the MID, the manager-client secret key MC, the authorization message, and the server electronic signature value Sig_S of the MDM server 100.

Also, the D2D client 300 verifies the server electronic signature value Sig_S for the authorization message, and stores the manager-client secret key MC and the authorization message when the electronic signature value Sig_S is valid (S114).

Subsequently, the D2D client 300 transmits a verification-success signal indicating that the authorization message has been successfully received to the D2D manager 200, and the D2D manager 200 transfers the verification-success signal to the MDM server 100 (S115).

Through the above-described process, the D2D manager 200 acquires authority to manage the D2D client 300 from the MDM server 100, and the D2D client 300 recognizes that the D2D manager 200 is a legitimate manager of the D2D client 300, so that an environment in which the D2D client 300 is managed by the D2D manager 200 is set.

Figure 5:
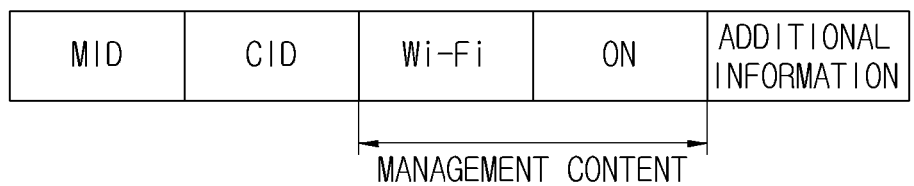
FIG. 5 is a diagram showing a packet structure of a management message according to an exemplary embodiment of the present invention.

Meanwhile, when the D2D manager 200 intends to manage the user mobile device, the D2D manager 200 generates a management message as shown in FIG. 5, encrypts the management message with the manager-client secret key MC, and then transmits the management message to the D2D client 300. Here, the management message includes the unique number MID of the D2D manager 200, the unique number CID of the D2D client 300, and management information.

Therefore, the user mobile device is caused to turn on the Wi-Fi function using the management information.

The D2D client 300 having received the management message decrypts the management message, performs an operation according to the management information, encrypts a result value of the operation, and transmits the operation result value to the D2D manager 200. Here, the operation result value may include state change information, global positioning system (GPS) position information, or so on.

The D2D manager 200 decrypts the operation result value transmitted from the D2D client 300, and stores current state information in a device state table showing the state of the user mobile device that is a management target. FIG. 6 shows an example of the device state table.

The D2D manager 200 periodically transfers the device state table to the MDM server 100, thereby synchronizing the current state of the user mobile device with the MDM server 100.

The D2D manager 200 repeatedly performs management of the user mobile device and synchronization with the MDM server 100 as many times as necessary within the validity period of authority.

Thus far, a data transmission and reception process has been described assuming that each entity, that is, the MDM server 100, the D2D manager 200, and the D2D client 300, has its own public key and private key.

From now, a data transmission and reception process will be described assuming that the D2D manager 200 and the D2D client 300 have only a secret key to share with the MDM server 100. Here, a method for the D2D manager 200 to manage the D2D client 300 and synchronize the user mobile device with the MDM server 100 is the same as the above-described operation. Therefore, the method will not be described again, and the data transmission and reception process will be described, focusing on an authority acquisition process using a key.

Figure 7:
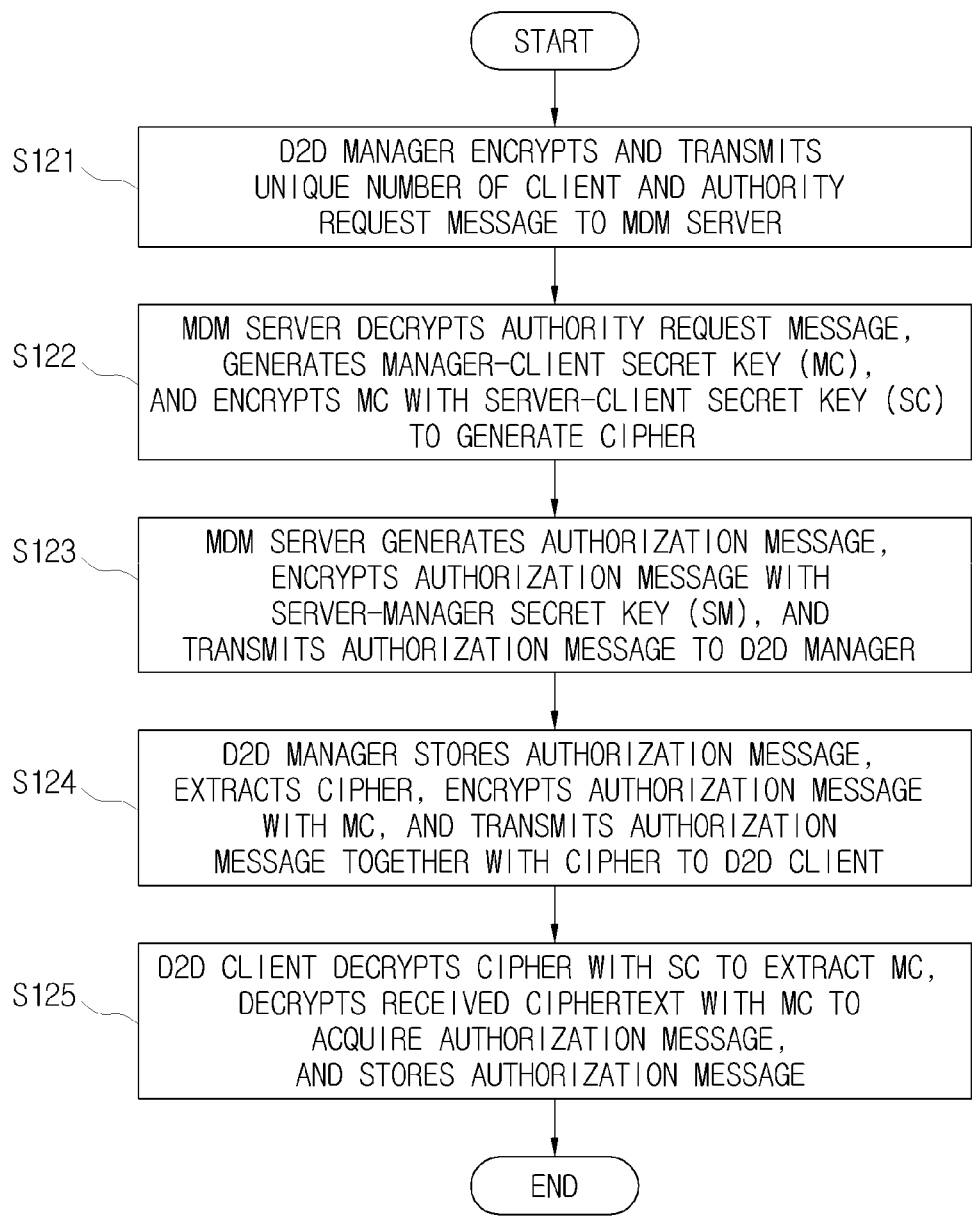
FIG. 7 is a detailed operational flowchart illustrating another example of a method for a D2D manager to acquire authority to manage a D2D client from an MDM server according to the first exemplary embodiment of the present invention.

FIG. 7 is a flowchart illustrating another example of a process for a D2D manager to acquire authority from an MDM server according to the first exemplary embodiment of the present invention.

Here, the D2D manager 200 and the D2D client 300 have a server-manager secret key SM and a server-client secret key SC, respectively. These keys may be set when the D2D manager 200 and the D2D client 300 initially install a program from the MDM server 100.

First, the D2D manager 200 encrypts the unique number (CID) of the D2D client 300 to be controlled and a management authority request message with the server-manager secret key SM, and transmits the encrypted management authority request message to the MDM server 100 (S121).

Subsequently, the MDM server 100 decrypts the received encrypted management authority request message, and generates a manager-client secret key MC to be used by the D2D manager 200 and the D2D client 300. Also, the MDM server 100 encrypts the decrypted management authority request message with the server-client secret key SC to generate a cipher (S122).

Then, the MDM server 100 generates a management authorization message having a packet structure as shown in FIG. 8, encrypts the generated management authorization message with the server-manager secret key SM, and transmits the encrypted management authorization message to the D2D manager 200 (S123).

In the packet structure of FIG. 8, an MID is the unique number of the D2D manager 200, and a CID is the unique number of the D2D client 300. Also, a validity period indicates the validity period of the management authorization message, and an MC is the manager-client secret key.

Next, the D2D manager 200 decrypts the encrypted management authorization message transmitted from the MDM server 100, stores the management authorization message, and extracts the cipher from the authorization message. Also, the D2D manager 200 encrypts the management authorization message again with the manager-client secret key MC to generate ciphertext, and transmits the generated ciphertext and the extracted cipher to the D2D client 300 (S124).

The D2D client 300 receives the cipher transmitted from the D2D manager 200, and decrypts the received cipher with the server-client secret key SC to extract the manager-client secret key MC.

Also, the D2D client 300 decrypts the ciphertext transmitted from the D2D manager 200 with a client-manager secret key CM to acquire the authorization message, and stores the authorization message (S125).

Second Exemplary Embodiment

Figure 9:
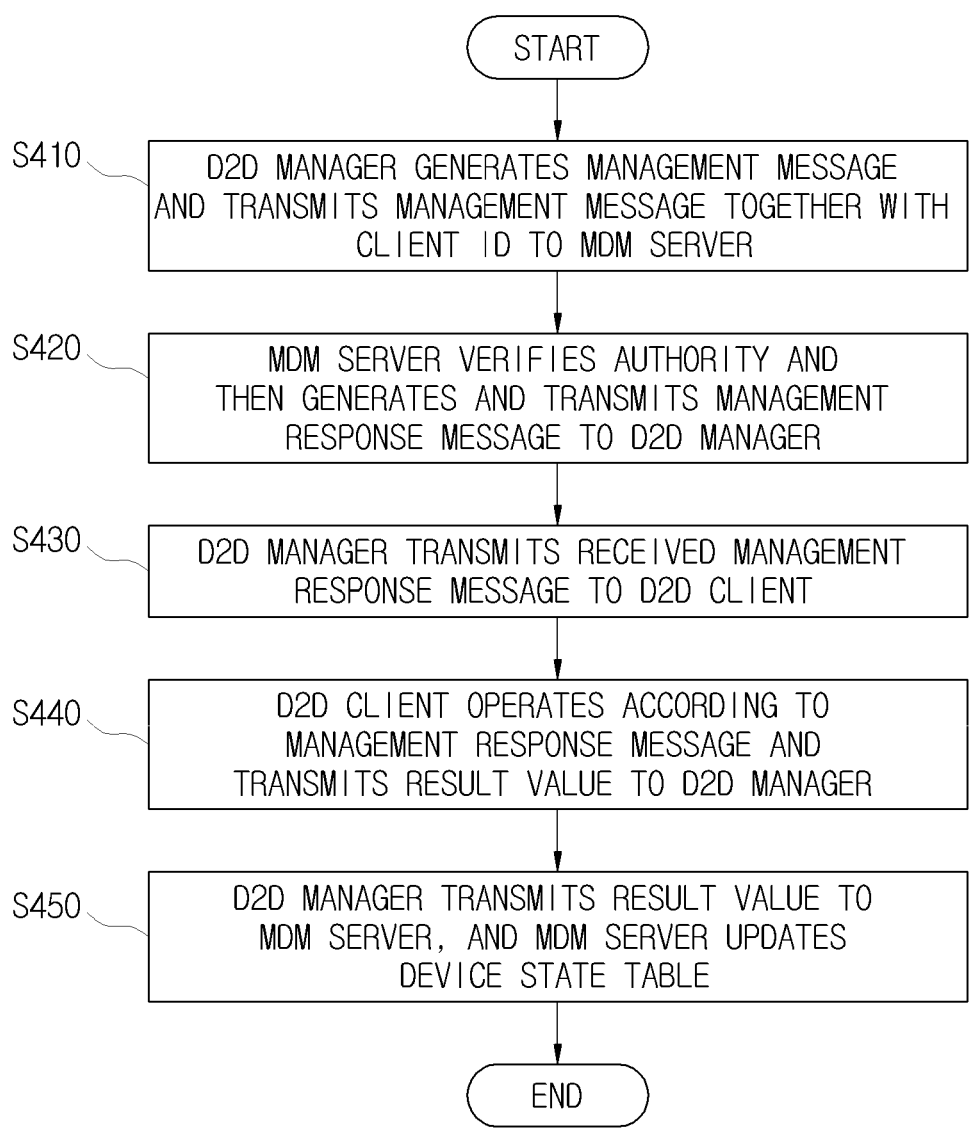
FIG. 9 is an operational flowchart illustrating a method of managing a mobile device in a D2D mobile management system according to a second exemplary embodiment of the present invention.

FIG. 9 is an operational flowchart illustrating a method of managing a mobile device in a D2D mobile management system according to a second exemplary embodiment of the present invention.

The second exemplary embodiment described below relates to a D2D mobile management system referred to as a security-fortified D2D mobile management system in the present invention. A method of managing a mobile device using D2D communication according to the second exemplary embodiment will be described, focusing on the operation of each component.

First, when the D2D manager 200 intends to manage the D2D client 300, the D2D manager 200 generates a management message having a packet structure as shown in FIG. 10 and transmits the management message together with the unique number (CID) of the D2D client 300 to the MDM server 100 (S410). At this time, the D2D manager 200 encrypts the unique number (CID) of the D2D client 300 together with the management message with a server-manager secret key SM, and transmits the management message and the unique number (CID) to the MDM server 100.

Next, the MDM server 100 determines whether the D2D manager 200 having transmitted the management message has authority to manage the D2D client 300, generates a management response message in response to the received management message, and then transmits the generated management response message to the D2D manager 200 (S420). At this time, the MDM server 100 decrypts the encrypted management message transmitted from the D2D manager 200 to extract the management message, and generates the management response message for managing the D2D client 300 based on the extracted management message.

Then, the MDM server 100 encrypts the generated management response message with a server-client secret key SC to generate first ciphertext C1, encrypts again the management response message and the ciphertext C1 with the server-manager secret key SM to generate second ciphertext C2, and transmits the second ciphertext C2 to the D2D manager 200.

Next, the D2D manager 200 receiving the management response message transmits the management response message to the D2D client 300 (S430). In other words, the D2D manager 200 decrypts the received ciphertext C2 to extract the management response message and the first ciphertext C1, and transmits the extracted first ciphertext C1 to the D2D client 300.

The D2D client 300 receiving the management response message performs an operation according to the content of the management response message, and transmits a result value of the operation to the D2D manager 200 (S440). In other words, the D2D client 300 decrypts the received first ciphertext C1 with the server-client secret key SC, extracts the management response message to perform the operation according to the extracted management response message, and then transmits the result value of the operation to the D2D manager 200.

Next, the D2D manager 200 transmits the operation result value received from the D2D client 300 to the MDM server 100, and the MDM server 100 receiving the operation result value updates a device state table as shown in FIG. 6 with the operation result value (S450).

As described above, in an existing MDM system, it is not possible to transfer control and management messages unless a user's mobile device is connected to the Internet via a Wi-Fi system or a 3G system, but, in exemplary embodiments of the present invention, an MDM manager having acquired control authority can control and manage the mobile device using a short-range communication network conforming to Wi-Fi Direct or so on.

In addition, using exemplary embodiments of the present invention, a D2D MDM system may be configured so that control and management messages can be transferred through only a short-range communication network. Therefore, hackers who search many and unspecified targets for vulnerable points in security cannot even attempt to make attacks, and fortified security can be provided.

Further, since personal mobile devices used for business and other purposes in companies, schools, etc., can be controlled and managed by MDM, the users of the mobile devices think that their privacy may be invaded by MDM anytime anywhere and have resistance to installation of an MDM program. However, according to exemplary embodiments of the present invention, when a user leaves a predetermined place, such as a company or a school, a manager cannot control and manage the user's mobile device, and thus the problem of an invasion of privacy can be fundamentally solved in the space of private life.

In particular, according to exemplary embodiments of the present invention, a system may be configured so that a teacher in a school can control and manage students in a classroom using a short-range communication network conforming to Wi-Fi Direct or so on, and cannot even access the students' mobile devices when the students are not under the control of the teacher, such as after school. Therefore, the problem of an invasion of students' privacy caused by installation of an MDM program can be appropriately solved, and an optimal method for controlling and managing students' mobile devices in a school can be provided.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system for managing a mobile device using device-to-device (D2D) communication, the system comprising:
a mobile device management (MDM) server;
a user mobile device having a D2D MDM client (D2D client); and
an administrator mobile device having a D2D MDM manager (D2D manager),
wherein the D2D manager acquires authority to manage the D2D client from the MDM server and manages the D2D client, and
the D2D client performs an operation in the user mobile device according to management of the D2D manager and transmits a result value of the operation to the MDM server via the D2D manager,
wherein the acquiring of the management authority comprises:
encrypting, by the D2D manager, the management authorization request message together with a unique number of the D2D client to be managed with a server-manager secret key, and transmitting the management authorization request message and the unique number to the MDM server;
encrypting, by the MDM server, a management authorization message including the validity period and a server electronic signature value for the management authorization message with the server-manager secret key, and transmitting the management authorization message and the server electronic signature value to the D2D manager;
generating, by the D2D manager, a manager-client secret key, generating a message encrypted with a public key of the D2D client to be managed, and transmitting the encrypted message together with a manager electronic signature 15 value for the encrypted message to the D2D client; and
receiving, by the D2D client, the message encrypted by the D2D manager, verifying the manager electronic signature value, decrypting the encrypted message, and storing the management authorization message and the manager-client secret key when the manager electronic signature value is valid.

2. The system of claim 1, wherein, when an authority request message for managing the D2D client is received from the D2D manager, the MDM server transmits a management authorization message including a valid management period to the D2D manager, and
the D2D manager manages the D2D client for the valid management period.

3. The system of claim 1, wherein the MDM server receives the operation result value transmitted from the D2D client, and updates a state table of the user mobile device.

4. The system of claim 1, wherein, after acquiring the management authority from the MDM server, the D2D manager transmits a management message including management information to the D2D client, and
the D2D client performs the operation according to the management 5 information included in the management message.

5. A method of managing a mobile device using device-to-device (D2D) communication in a mobile management system including a mobile device management (MDM) server, the method comprising:
transmitting, from a D2D MDM manager (D2D manager), a D2D MDM client (D2D client) management authorization request message to the MDM server to acquire management authority from the MDM server;
managing, by the D2D manager having acquired the management authority, a D2D MDM client (D2D client) for a previously set validity period; and
transmitting, from the D2D manager, an operation result value of a user mobile device acquired while managing the D2D client to the MDM server,
wherein the acquiring of the management authority comprises:
encrypting, by the D2D manager, the management authorization request message together with a unique number of the D2D client to be managed with a server-manager secret key, and transmitting the management authorization request message and the unique number to the MDM server;

encrypting, by the MDM server, a management authorization message including the validity period and a server electronic signature value for the management authorization message with the server-manager secret key, and transmitting the management authorization message and the server electronic signature value to the D2D manager;

generating, by the D2D manager, a manager-client secret key, generating a message encrypted with a public key of the D2D client to be managed, and transmitting the encrypted message together with a manager electronic signature 15 value for the encrypted message to the D2D client; and receiving, by the D2D client, the message encrypted by the D2D manager, verifying the manager electronic signature value, decrypting the encrypted message, and storing the management authorization message and the manager-client secret key when the manager electronic signature value is valid.

6. The method of claim 5, further comprising receiving, by the MDM server, the operation result value, and updating a state table of the user mobile device.

7. The method of claim 5, wherein, when the management authorization request message is received from the D2D manager, the MDM server transmits an authorization message including the validity period, and the D2D manager manages the D2D client for the validity period.

8. The method of claim 1, wherein the message encrypted with the public key of the D2D client to be managed includes a unique number of the D2D manager, the manager-client secret key, the management authorization message, and the server electronic signature value.

9. The method of claim 8, wherein the storing of the management authorization message and the manager-client secret key comprises decrypting, by the D2D client, the encrypted message transmitted from the D2D manager to extract the unique number of the D2D manager, the manager-client secret key, the management authorization message, and the server electronic signature value, and verifying whether the server electronic signature value is valid.

10. The method of claim 5, further comprising, after the verifying of the manager electronic signature value, transmitting, from the D2D client, a verification-1 0 success signal to the MDM server via the D2D manager.

11. A method of managing a mobile device using device-to-device (D2D) communication in a a mobile management system including a mobile device management (MDM) server, the method comprising:

transmitting, from a D2D MDM manager (D2D manager), a D2D MDM client (D2D client) management authorization request message to the MDM server to acquire management authority from the MDM server;

managing, by the D2D manager having acquired the management authority, a D2D MDM client (D2D client) for previously set validity period; and transmitting, from the D2D manager, an operation result value of a user mobile device acquired while managing the D2D client to the MDM server, wherein the acquiring of the management authority comprises:

transmitting, from the D2D manager, the management authorization request message together with a unique number of the D2D client to be managed to the MDM server;

generating, by the MDM server, a manager-client secret key to be used by the D2D manager and the D2D client, and encrypting the generated secret key with a server-client secret key to generate a cipher;

generating, by the MDM server, a management authorization message, encrypting the management authorization message with a server-manager secret key, and transmitting the management authorization message to the D2D manager;

decrypting, by the D2D manager, the management authorization message to extract the cipher, encrypting the authorization message with the manager-client secret key, and transmitting the authorization message together with cipher to the D2D client; and decrypting, by the D2D client, the cipher with the server-client secret key to extract the manager-client secret key, and decrypting the encrypted management authorization message with the manager-client secret key to acquire the management authorization message.

12. The method of claim 11, wherein the management authorization message includes a unique number of the D2D manager, the unique number of the 10 D2D client, the validity period, and the manager-client secret key.

13. A system for managing a mobile device using device-to-device (D2D) communication, the system comprising:

a mobile device management (MDM) server;

a user mobile device having a D2D MDM client (D2D client); and an administrator mobile device having a D2D MDM manager (D2D manager), wherein the D2D manager transmits a management message including management information for the D2D client to the MDM server, receives a management response message from the MDM server, and manages the D2D client, and the D2D client implements management content in the user mobile device and transmits a management result value to the MDM server via the D2D manager, wherein the acquiring of the management authority comprises:

encrypting, by the D2D manager, the management authorization request message together with a unique number of the D2D client to be managed with a server-manager secret key, and transmitting the management authorization request message and the unique number to the MDM server;

encrypting, by the MDM server, a management authorization message including the validity period and a server electronic signature value for the management authorization message with the server-manager secret key, and transmitting the management authorization message and the server electronic signature value to the D2D manager;

generating, by the D2D manager, a manager-client secret key, generating a message encrypted with a public key of the D2D client to be managed, and transmitting the encrypted message together with a manager electronic signature 15 value for the encrypted message to the D2D client; and receiving, by the D2D client, the message encrypted by the D2D manager, verifying the manager electronic signature value, decrypting the encrypted message, and storing the management authorization message and the manager-client secret key when the manager electronic signature value is valid.

14. The system of claim 13, wherein the MDM server determines whether the D2D manager having transmitted the management message has authority to manage the D2D client and, when it is determined that the D2D manager has the authority to manage the D2D client, encrypts ciphertext obtained by encrypting the management response message and the management response message with a server-manager secret key, and transmits the ciphertext and the management response message to the D2D manager.

15. The system of claim 14, wherein the D2D manager decrypts the ciphertext and the management response message transmitted from the MDM server to extract the management response message and the ciphertext, and transmits the ciphertext to the D2D client.

16. A method of managing a mobile device using device-to-device (D2D) communication in a mobile management system including a mobile device management (MDM) server, the method comprising:

transmitting, from a D2D MDM manager (D2D manager), an encrypted management message to the MDM server;

determining, by the MDM server, whether the D2D manager has authority to manage a D2D client, and transmitting a management response message to the management message to the D2D server;

transmitting, from the D2D manager, the management response message to the D2D client;

performing, by the D2D client, an operation of a user mobile device according to content of the response message and transmitting a result value of the operation to the D2D manager; and transmitting, from the D2D manager, the operation result value to the MDM server, and updating, by the MDM server, a state table of the user mobile device with the operation result value, wherein the acquiring of the management authority comprises:

encrypting, by the D2D manager, the management authorization request message together with a unique number of the D2D client to be managed with a server-manager secret key, and transmitting the management authorization request message and the unique number to the MDM server;

encrypting, by the MDM server, a management authorization message including the validity period and a server electronic signature value for the management authorization message with the server-manager secret key, and transmitting the management authorization message and the server electronic signature value to the D2D manager;

generating, by the D2D manager, a manager-client secret key, generating a message encrypted with a public key of the D2D client to be managed, and transmitting the encrypted message together with a manager electronic signature 15 value for the encrypted message to the D2D client; and receiving, by the D2D client, the message encrypted by the D2D manager, verifying the manager electronic signature value, decrypting the encrypted message, and storing the management authorization message and the manager-client secret key when the manager electronic signature value is valid.

17. The method of claim 16, wherein the transmitting of the encrypted management message comprises encrypting, by the D2D manager, the management message and a unique number of the D2D client with a server-manager secret key and transmitting the management message and the unique number to the MDM server.

18. The method of claim 16, wherein the transmitting of the management response message comprises generating, by the MDM server, ciphertext by encrypting the management response message with a server-client secret key, encrypting again the management response message and the ciphertext with a server-manager secret key, and transmitting the management response message and the ciphertext to the D2D manager.

19. The method of claim 16, wherein the transmitting of the management response message to the D2D client comprises decrypting, by the D2D manager, the encrypted management response message and the encrypted ciphertext to extract the management response message and the ciphertext, and transmitting the ciphertext to 25 the D2D client.

* * * * *